United States Patent
Warrier et al.

(10) Patent No.: US 7,966,458 B2
(45) Date of Patent: Jun. 21, 2011

(54) METHOD AND APPARATUS FOR CONTROLLING A PRIMARY OPERATING SYSTEM AND AN APPLIANCE OPERATING SYSTEM ON THE SAME MACHINE

(75) Inventors: Ulhas Warrier, Beaverton, OR (US); Ram Chary, Portland, OR (US); Hani Elgebaly, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 11/694,997

(22) Filed: Mar. 31, 2007

(65) Prior Publication Data

US 2008/0244168 A1    Oct. 2, 2008

(51) Int. Cl.
*G06F 12/00* (2006.01)
(52) U.S. Cl. ..... 711/152; 711/6; 711/105; 711/E12.016; 711/E12.059
(58) Field of Classification Search ............. 711/6, 105, 711/152, E12.016, E12.059
See application file for complete search history.

(56) References Cited

U.S. PATENT DOCUMENTS

| | | | |
|---|---|---|---|
| 6,763,458 B1* | 7/2004 | Watanabe et al. | 713/100 |
| 2004/0153834 A1* | 8/2004 | Oshima et al. | 714/38 |
| 2004/0221194 A1* | 11/2004 | Denninghoff et al. | 714/11 |
| 2005/0125513 A1* | 6/2005 | Lam et al. | 709/220 |

* cited by examiner

*Primary Examiner* — Mardochee Chery
(74) *Attorney, Agent, or Firm* — Schwegman, Lundberg & Woessner, P.A.

(57) ABSTRACT

One embodiment includes a personal computer device comprising at least one machine to execute a primary user operating system, a first physical memory to be used by the primary user operating system, at least one appliance operating system that is independent from the primary user operating system, a second physical memory to be sequestered from the primary user operating system and an access violation monitor to restrict access from the at least one appliance operating system to the second physical memory, wherein the access violation monitor is to run only when the at least one appliance operating system is invoked and at least one appliance operating system is to be invoked only after the primary user operating system has been suspended to a standby state.

14 Claims, 4 Drawing Sheets

METHOD AND APPARATUS FOR CONTROLLING A PRIMARY OPERATING SYSTEM AND AN APPLIANCE OPERATING SYSTEM ON THE SAME MACHINE

TECHNICAL FIELD

Various embodiments described herein relate to computer operating systems generally, including method and apparatus for controlling a primary operating system and an appliance operating system.

BACKGROUND

Currently, there are two ways to run appliance functionality on a system while keeping the primary operating system (OS) environment in a preserved state. Each of these has their disadvantages. In a first way, a user can invoke the appliance functionality within the primary OS. The primary OS, being aware of the special needs of the appliance does the appropriate changes to the software and hardware environment to accommodate this. There are several disadvantages to this. One disadvantage is that appliance developers may want to use an OS that is tailored for their application, e.g. developers may want easy portability from a hard appliance model. Another disadvantage is that appliance functionality would be subject to vulnerabilities and instability of primary OS. One additional disadvantage is that appliance mal-functions can damage the primary OS environment. A further disadvantage is that specific requirements of the Appliance such as power optimization (e.g., extended media play), and real-time response will most likely be not met by a general purpose primary OS.

In a second way, the primary OS environment is preserved in a hibernation state and the system is switched to a different mode. This is currently used by some OEMs for hosting single functions such as DVD playback. This puts the primary OS environment into a saved state on the hard disk. This has a disadvantage that a switch to the appliance mode takes an undesirably long time.

This can take 20 seconds, depending on the system memory usage by primary OS. This makes frequent mode switches cumbersome, thereby impeding various functions such a usage of a secure browser.

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and the operating environment in conjunction with which embodiments can be practiced.

System Level Overview

Figure 1:
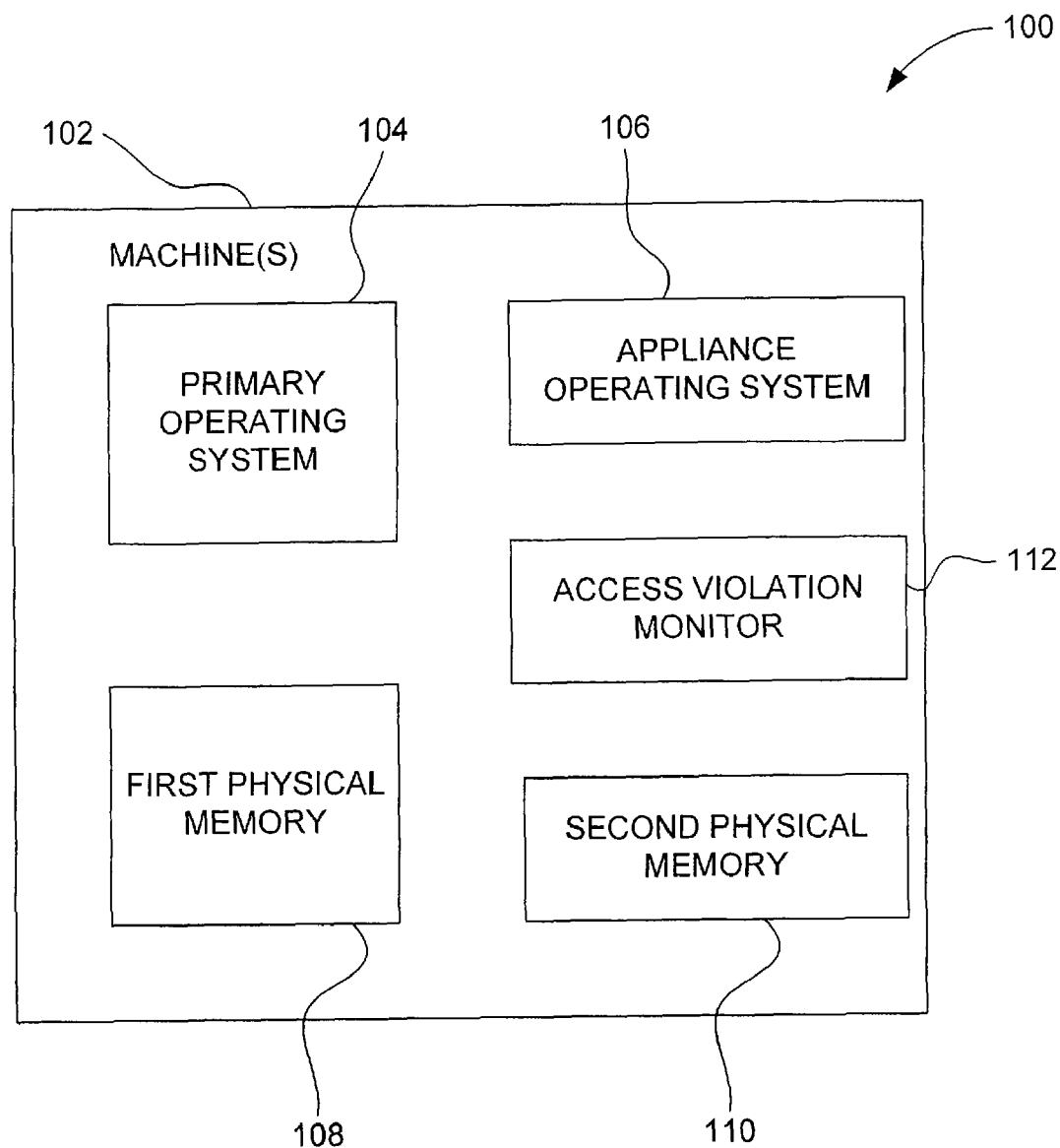
FIG. 1 is a block diagram of a system according to various embodiments of the invention.

FIG. 1 comprises a block diagram of a computer having a first and second physical memory, according to one embodiment of the present subject matter. One embodiment of the present subject matter includes a personal computer device which includes at least one machine 102 to execute a primary user operating system 104. Various embodiments include a first physical memory 108 to be used by the primary user operating system 104. Various embodiments include at least one appliance operating system 106 that is independent from the primary user operating system 104. Certain examples include a second physical memory 110 to be sequestered from the primary user operating system 104. Some examples include an access violation monitor 112 to restrict access from the at least one appliance operating system 106 to the second physical memory 110. Some examples are implemented such that the access violation monitor 112 is to run only when the at least one appliance operating system 106 is invoked. Certain examples are implemented such that the at least one appliance operating system 106 is to be invoked only after the primary user operating system 104 has been suspended to a standby state.

Various examples include a computer device in which the standby state is a suspend to random access memory (RAM) state. Some examples include a personal computer device which includes a non-volatile storage, wherein the non-volatile storage includes the access violation monitor and the at least one appliance operating system. Certain examples include a personal computer device which includes a virtual machine monitor. In some examples, the virtual machine monitor is to determine which of the at least one appliance operating systems is to be invoked. Various examples include a personal computer device in which at least one appliance operating system is a digital versatile disc (DVD) player. Some embodiments include a personal computer device in which at least one appliance operating system is a secure internet browser. Certain examples include a personal computer device in which at least one appliance operating system is to provide voice over internet protocol (VOIP). Various embodiments include a personal computer device in which at least one machine comprises a virtual machine. Some examples include a personal computer device which include a keyboard. In various embodiments, a hot key combination on the keyboard is to determine which of the at least one appliance operating systems is to be invoked.

Methods

In this section, particular methods of example embodiments are described by reference to a flow chart. The methods to be performed constitute computer programs made up of computer-executable instructions.

Figure 2:
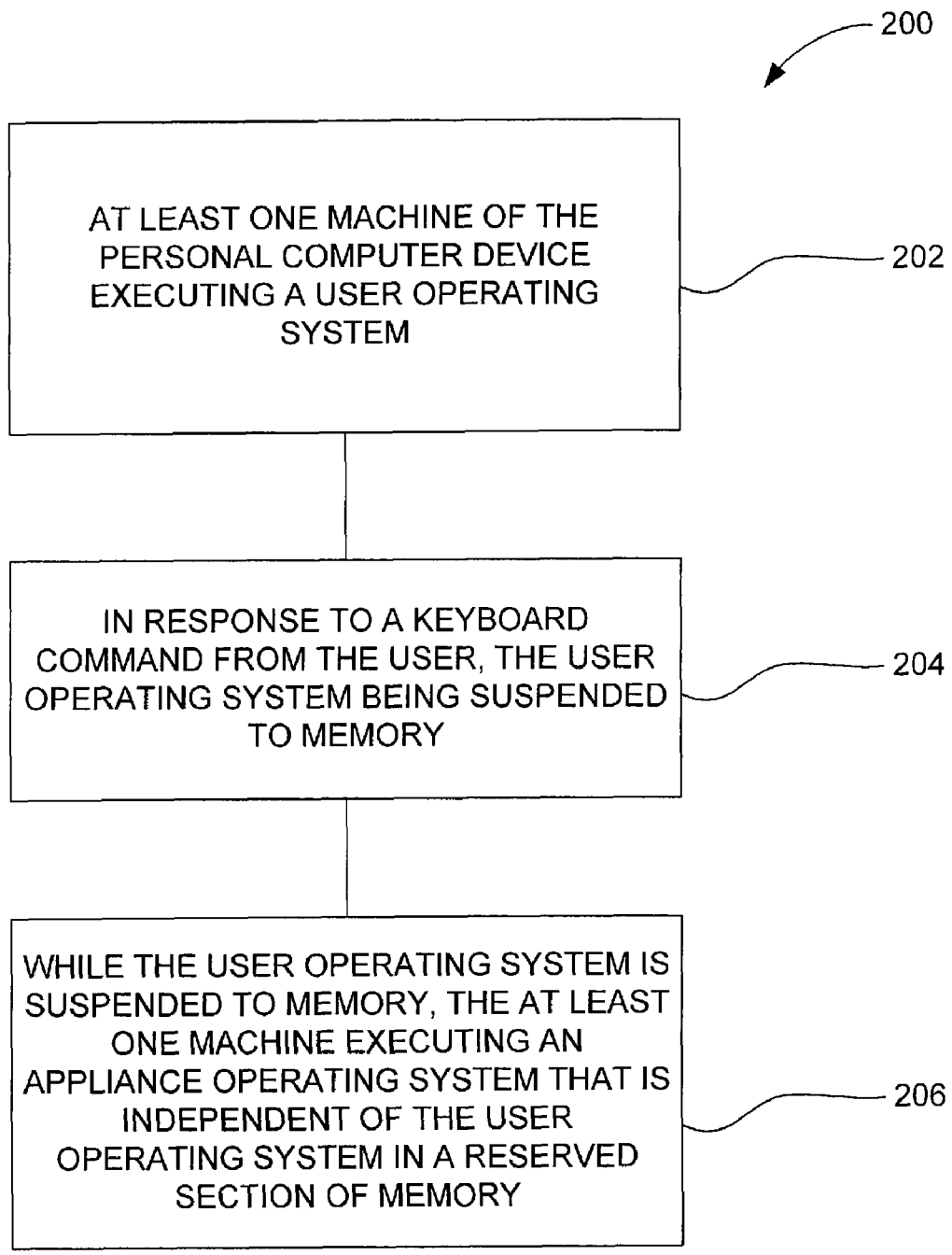
FIG. 2 is a flow diagram illustrating several methods according to various embodiments of the invention.

FIG. 2 is a flow diagram illustrating several methods according to various embodiments of the invention. Various embodiment include a method of operating a personal computer device which includes, at 202, at least one machine of the personal computer device executing a user operating system. Certain embodiment include a method of operating a personal computer device which includes, at 204, in response to a keyboard command from the user, the user operating system being suspended to memory. Some methods include, at 206, operating a personal computer device while the user operating system is suspended to memory, the at least one machine executing an appliance operating system that is independent of the user operating system in a reserved section of memory.

Some method embodiments operate a personal computer device which includes a write protected non-volatile storage. Certain method embodiments include a personal computer device which operates such that when the appliance operating system is to be executed, the appliance operating system is retrieved from the non-volatile storage. Various method examples include operating a personal computer device which includes a power supply. Some examples operate a personal computer device such that while the appliance operating system is executing, the power supply is operating in a reduced power mode. In some examples of operating a personal computer device the appliance operating system is to be executing in less than twenty seconds after the keyboard command from the user. In certain examples of operating a personal computer system, if the appliance operating system terminates, the user operating system resumes from being suspended to memory. Some examples include a machine-accessible medium having associated instructions, wherein the instructions, when accessed, result in a machine performing one or more of the methods associated with FIG. 2.

It may be possible to execute the activities described herein in an order other than the order described. And, various activities described with respect to the methods identified herein can be executed in repetitive, serial, or parallel fashion.

Example Implementations

Various examples of systems and methods for embodiments of the invention have been described above. This section illustrates an example of method and apparatus for enabling a contained execution mode using embedded flash and virtualization technology (VT) capabilities of a platform without impacting user operating system performance and integrity.

Various embodiments describe a new mode of operation for computers referred to as 'Stand-by Embedded Appliance Mode' (SEAM). In various embodiments, the SEAM is used on the PC platform, but the present subject matter is not so limited. The present subject matter provides the ability to run applications in an environment isolated from the main (primary) OS that the machine typically runs. In various embodiments, the primary OS is in a 'suspend' mode. The present subject matter is useful for the following applications including, but not limited to, DVD player, VOIP and secure browsers.

Various embodiments include a reserved (e.g., a second) physical memory. In various embodiments, then booting the primary OS, the BIOS/Firmware marks a section of physical memory as reserved and indicates it as such to the primary OS. In various embodiments, the reserved memory is indicated via the e820 tables, but the present subject matter is not so limited. In certain examples, the reserved memory is sequestered from the primary OS memory. In some examples, the reserved memory is used by one or more appliances while executing their respective functions. In various embodiments, the size of the reserved memory is based on the specific Appliance functions designated to use the reserved memory.

Example implementations of several aspects of the present subject matter are described in more detail below.

Appliance OS (AOS). Various embodiments include an embedded-style operating environment with characteristics suitable to run an appliance functionality. Certain examples include a conservative storage, memory and power footprint. Some examples support real-time functions. Various examples have quick boot-up and tear down times. Some examples host improved drivers for specific devices.

Access Violation Monitor (AVM). Various embodiments include an ultra lightweight Virtual Machine Monitor (VMM) that runs only when the Appliance functionality is invoked. In various embodiments, a primary function is to restrict access from the Appliance functionality to the memory that is reserved for its use via the use of VT Technology on the platform. In some embodiments, the AVM may assign all the devices and interrupts directly to the Appliance OS. Some embodiments except hard disk drive (HDD). Certain examples may not host a scheduler. In various embodiments, the AVM may virtualize memory and maintain a second layer of page tables. In some embodiment, the present subject matter may utilize Extended Page Table functionality if available. Various embodiment may capture all page table changes made by the Appliance OS. In some examples, to improve performance, no translation is done by AVM. Certain examples operate such that the Appliance OS is aware of non-zero based memory. In various embodiments, the AVM can host additional services for the appliance OS to allow abstraction of functionality across appliances including, but not limited to, agent presence, ME services and TSS TPM services.

Non-volatile Storage (NVS). In various embodiments, a portion of the NVS area is reserved for use by various appliances including, but not limited to, secure browsing, DVD and VOIP softphone. In various embodiments, this area contains the AVM and AOS and related configuration details. In certain examples, such a configuration assists in a boot-up and tear-down process demonstrating improved speed. In various embodiments, the partition maybe write protected using hardware mechanisms such that it cannot be tampered with or over-written. Some embodiments make one or more partitions independent of the transgressions and instability of the primary OS. In various embodiments, the partition is uploaded via special tools that place the usage scenario image on flash.

Hot key. In various embodiments, dedicated keys and/or a combination of function keys on the keyboard are employed by the user to activate the Appliance mode. In some embodiments, the activation starts by indicating to the primary OS that it must enter 'suspend to RAM' (S3) state. In certain examples, when the system has successfully entered the S3 state, system context except for system memory are invalid (e.g., CPU, cache, and device context are not maintained). In various embodiments, the RAM can be in refresh mode. In some examples, the power supply is in a reduced power mode. In various embodiments, as part of the hot key function, the system initiates a slightly different 'resume from standby' process. In certain examples, system logic handles functions including, but not limited to, power-on synchronization, voltage regulator ramp up and stabilization and clock source stabilization. Some embodiments present improvements in by-passing or shortening the system power-down and power-up process.

BIOS changes. In various embodiments, the processor begins executing instructions at a new power-on reset vector. In various embodiments, one or more sections of the BIOS logic initialize the system hardware to a different context by initializing the CPU, enabling memory, configuring and enabling caches, and initializing the chipset. In various embodiments, BIOS initializes the system hardware and loads the AVM code. Various embodiments determine whether the processor supports VMX operation via CPUID, and begins execution of the AVM.

In various embodiments, the AVM code enters VMX operation by executing the VMXON instruction. Certain embodiments configure the VMCS structure for a single guest VM to trap on CR3 changes. Some examples create the guest VM and pass control to the AOS. Depending on the configuration information stored in NVS, in some examples the AOS may either start new or resume a previously saved context.

In various embodiments, if more than one Appliance is to be supported, the specific Appliance to be invoked can be indicated by the user either via specific hot key combination, or a VMM interface that is presented before the invocation of AOS. In some embodiments, the same reserved memory space can be used by different Appliances. In certain examples, a specific region is allocated in the NVS for the different Appliance environments.

In various embodiments, control goes to the AVM when VM-exits are caused by the page table updates and AVM ensures that the AOS page tables do not refer to any on the pages that were in use by the primary OS.

Switching back to primary OS. In various embodiments, AVM gets control when the AOS terminates either abnormally or via user-initiated action using the hot key. In some examples, the AOS performs a quick suspend and saves the context for a later resume. In some embodiments, the AVM exits VMX operation by executing the VMXOFF instruction and instructs the chipset to initiate a 'suspend and power down' scenario. In stead of waiting for a user action or a hardware event, the system automatically starts the resume operation. The power-on reset vector in this case may activate the BIOS logic that is used to restore the primary OS environment.

Figure 3:
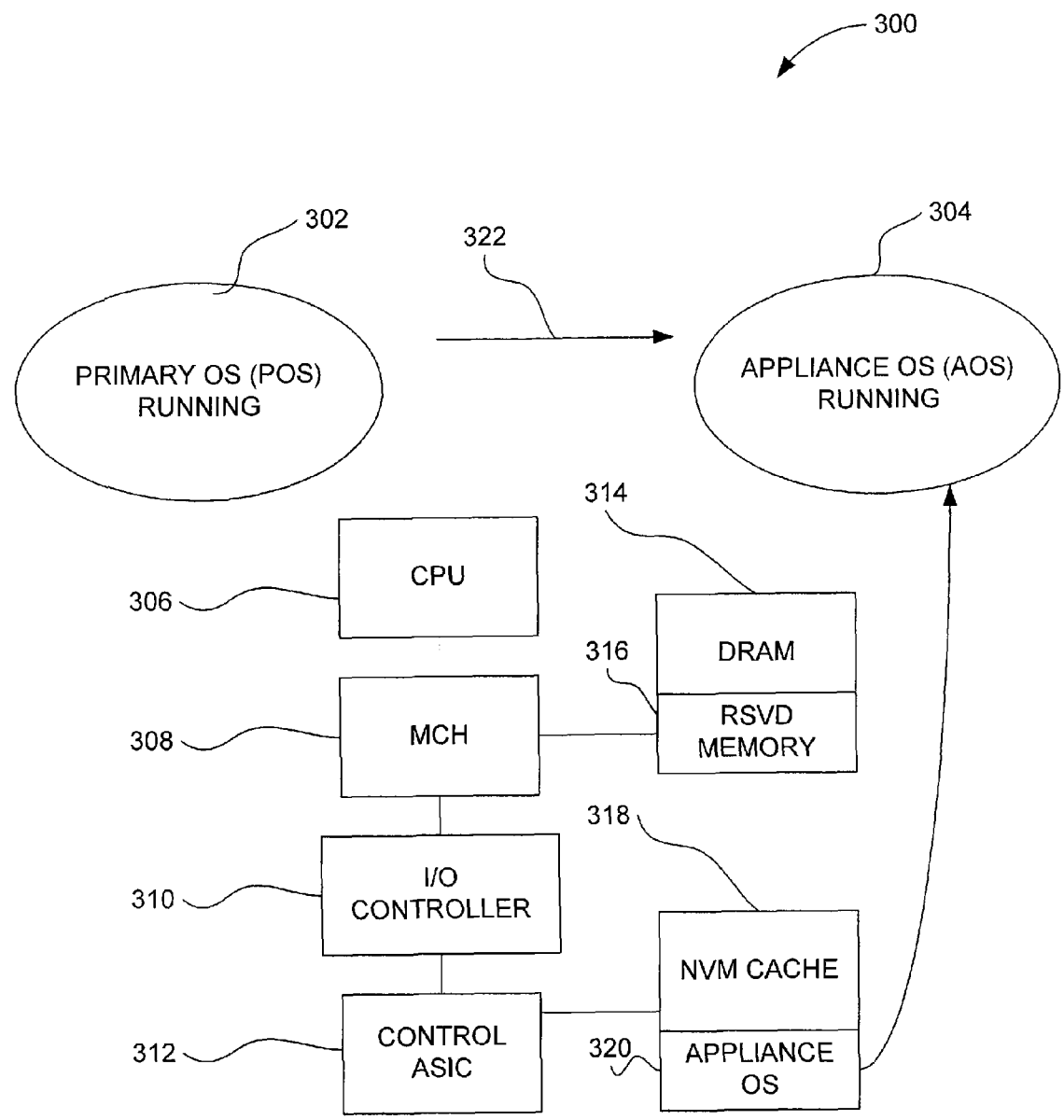
FIG. 3 is a schematic, according to one embodiment of the present subject matter.

FIG. 3 is a schematic, according to one embodiment of the present subject matter. Various embodiments include a primary OS 302 and an appliance OS 304. In various embodiments, activation 322 occurs when an user presses an appliance button, putting the POS system into standby. In various embodiments, the BIOS enters VMX modes, sets up a trap handler, configures the virtual machine control structure (VMCS), and loads the appliance OS. In various embodiments, the system includes a CPU 306, a memory controller hub (MCH) 308, an I/O controller 310, a control ASIC 312, DRAM 314, RSVD memory 316, non-volatile memory (NVM) cache 318, and an appliance OS 320.

Various embodiments use VT features so that the primary OS environment can be left in memory and protected at the platform level, without having to trust the robustness of the Appliance OS environment. Instead of the normal usage of virtualization (VT) technology to abstract the whole platform to present multiple virtual machines, this invention, in various embodiments, uses it run a single VM to ensure that it stays within part of the platform allocated to it.

According to embodiments of the subject matter, the primary OS can be unaware and untouched by the virtual machine extensions (VMX) usage in the Appliance mode and can even run its own virtual machine monitor (VMM) when it is in operation. This enables a manufacture to provide a product under any primary OS (e.g., Windows XP®, Windows Vista®, etc.). In addition, saving/restoring an Appliance environment while the primary OS stays resident is also a novel approach.

In some embodiments, using VT based protection permits implementation at a page level granularity. This protection can be further fortified by using virtualization technology for device I/O (VT-d) to protect direct memory access (DMA) access from devices to memory not assigned to them. Use of VT presents the opportunity to protect specific regions of code/data in the Appliance environment from malware that may be introduced during its operation. VT also gives the ability to present an abstract view of the platform that can ease portability burden on the Appliance vendors.

In addition, embedding the Appliance functionality adds further value to this platform solution by accelerating the mode-switch response time.

Various embodiments described here also enable use of appliance functionality and offer improved response time, sufficient security and extended power usage. Some embodiments of the present subject matter may be particularly useful to financial institutions who are expressly concerned about client information theft and financial loss.

Various embodiments demonstrate an appliance mode switch time that is substantially faster. In some embodiments, a primary OS is saved to a standby state as evidenced by a core dump. Various embodiment use VT to enforce protection as evidenced by a trace of the BIOS instructions or detecting change in behavior when running without VT hardware.

Hardware and Operating Environment

This section provides an overview of an example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 4 below.

Figure 4:
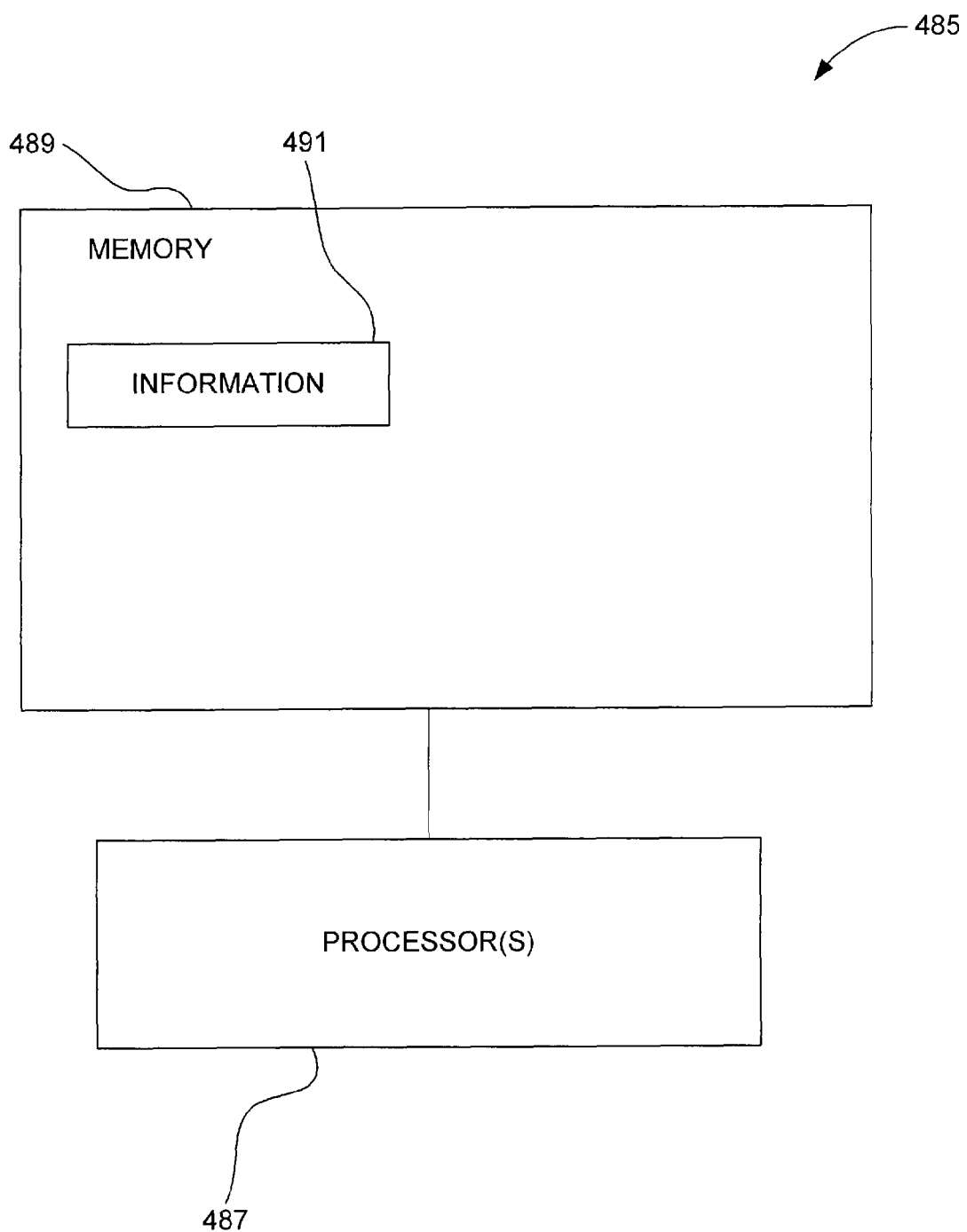
FIG. 4 is a block diagram of an article according to various embodiments of the invention.

FIG. 4 is a block diagram of an article 485 according to various embodiments of the invention. Such embodiments may comprise a computer, a memory system, a magnetic or optical disk, some other storage device, or any type of electronic device or system. The article 485 may include one or more processor(s) 487 coupled to a machine-accessible medium such as a memory 489 (e.g., a memory including electrical, optical, or electromagnetic elements). The medium may contain associated information 491 (e.g., computer program instructions, data, or both) which, when accessed, results in a machine (e.g., the processor(s) 487) performing the activities previously described herein.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, is apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. An apparatus comprising:
   At least one machine configured to execute a primary user operating system;
   a random access memory (RAM);
   a first portion of memory configured to be used by the primary user operating system, the first portion of memory being a section of the RAM;
at least one appliance operating system that is independent from the primary user operating system;
   a second portion of memory configured to be sequestered from the primary user operating system, the second portion of memory being a reserved section of the RAM; and
   an access violation monitor configured to restrict access from the at least one appliance operating system to the second portion of memory, by maintaining second layer of page tables configured to virtualize the RAM and assigning RAM interrupts to the at least one appliance operating system;
   wherein the access violation monitor is configured to run only when the at least one appliance operating system is invoked; and
   wherein the at least one appliance operating system is configured to be invoked only after the primary user operating system has been suspended to a standby state by storing a context of the primary operating system in the first memory, the context enabling the resumption of the primary operating system.

2. The apparatus recited in claim 1, further comprising a non-volatile storage, wherein the non-volatile storage comprises the access violation monitor and the at least one appliance operating system.

3. The apparatus recited in claim 1, further comprising a virtual machine monitor, and wherein the virtual machine monitor is to determine which of the at least one appliance operating systems is to be invoked.

4. The apparatus recited in claim 1, wherein the at least one appliance operating system is a digital versatile disc (DVD) player controller.

5. The apparatus recited in claim 1, wherein the at least one appliance operating system is a secure internet browser.

6. The personal computer device recited in claim 1, wherein the at least one appliance operating system is to provide voice over internet protocol (VOIP).

7. The apparatus recited in claim 1, wherein the at least one machine comprises a virtual machine.

8. The apparatus recited in claim 1, further comprising a keyboard, and wherein a hot key combination on the keyboard is to determine which of the at least one appliance operating systems is to be invoked.

9. A method of operating a personal computer device comprising:
   at least one machine of the personal computer device executing a user operating system;
   in response to a keyboard command from the user, the user operating system being suspended to random access memory (RAM), wherein suspended to RAM includes storing a context of the user operating system to RAM, the context enabling resumption of the user operating system;
   executing an appliance operating system by the at least one machine, the appliance operating system being independent of the user operating system in a reserved section of RAM, while the user operating system is suspended to RAM; and
   restricting the appliance operating system to the reserved section of RAM by maintaining second layer of page tables configured to virtualize the RAM and assigning RAM interrupts to the appliance operating system.

10. The method recited in claim 9,
    wherein the personal computer device comprises a write protected non-volatile storage; and
    wherein, when the appliance operating system is to be executed, the appliance operating system is retrieved from the non-volatile storage.

11. The method recited in claim 9,
    wherein the personal computer device comprises a power supply; and
    wherein, while the appliance operating system is executing, the power supply is operating in a reduced power mode.

12. The method recited in claim 9, wherein the appliance operating system is to be executing in less than twenty seconds after the keyboard command from the user.

13. The method recited in claim 9, wherein if the appliance operating system terminates, the user operating system resumes from being suspended to RAM.

14. A machine-accessible medium having associated instructions, wherein the instructions, when accessed, result in a machine performing operations comprising:
    at least one machine of a personal computer device executing a user operating system;
    in response to a keyboard command from the user, the user operating system being suspended to random access memory (RAM), wherein suspended to RAM includes storing a context of the user operating system to RAM, the context enabling resumption of the user operating system;

executing an appliance operating system by the at least one machine, the appliance operating system being independent of the user operating system in a reserved section of RAM, while the user operating system is suspended to RAM; and restricting the appliance operating system to the reserved section of RAM by maintaining second layer of page tables configured to virtualize the RAM and assigning RAM memory interrupts to the appliance operating system.

* * * * *

UNITED STATES PATENT AND TRADEMARK OFFICE
CERTIFICATE OF CORRECTION

| | | |
|---|---|---|
| PATENT NO. | : 7,966,458 B2 | Page 1 of 1 |
| APPLICATION NO. | : 11/694997 | |
| DATED | : June 21, 2011 | |
| INVENTOR(S) | : Ulhas Warrier et al. | |

It is certified that error appears in the above-identified patent and that said Letters Patent is hereby corrected as shown below:

In the Claims

In column 7, line 41, in Claim 1, delete "At" and insert -- at --, therefor.

Signed and Sealed this
Twenty-ninth Day of April, 2014

Michelle K. Lee
*Deputy Director of the United States Patent and Trademark Office*